United States Patent
Lee et al.

(10) Patent No.: US 9,176,930 B2
(45) Date of Patent: Nov. 3, 2015

(54) METHODS FOR APPROXIMATING HESSIAN TIMES VECTOR OPERATION IN FULL WAVEFIELD INVERSION

(71) Applicants: Sunwoong Lee, Houston, TX (US); Anatoly Baumstein, Houston, TX (US)

(72) Inventors: Sunwoong Lee, Houston, TX (US); Anatoly Baumstein, Houston, TX (US)

(73) Assignee: ExxonMobil Upstream Research Company, Houston, TX (US)

(*) Notice: Subject to any disclaimer, the term of this patent is extended or adjusted under 35 U.S.C. 154(b) by 302 days.

(21) Appl. No.: 13/655,171

(22) Filed: Oct. 18, 2012

(65) Prior Publication Data
US 2013/0138408 A1    May 30, 2013

Related U.S. Application Data

(60) Provisional application No. 61/564,669, filed on Nov. 29, 2011.

(51) Int. Cl.
*G01V 1/28*    (2006.01)
*G06F 17/16*   (2006.01)

(52) U.S. Cl.
CPC ......... *G06F 17/16* (2013.01); *G01V 1/28* (2013.01); *G01V 1/282* (2013.01); *G01V 2210/614* (2013.01); *G01V 2210/67* (2013.01); *G01V 2210/679* (2013.01)

(58) Field of Classification Search
CPC ............................. G01V 2210/66; G01V 1/282
USPC ........................................ 367/73, 38
IPC .................. G01V 1/282, 11/00, 1/28, 2210/679
See application file for complete search history.

(56) References Cited

U.S. PATENT DOCUMENTS

| 3,812,457 A | 5/1974 | Weller |
| 3,864,667 A | 2/1975 | Bahjat |

(Continued)

FOREIGN PATENT DOCUMENTS

| EP | 1 094 338 | 4/2001 |
| EP | 1 746 443 | 1/2007 |

(Continued)

OTHER PUBLICATIONS

U.S. Appl. No. 13/224,005, filed Sep. 1, 2011, Routh et al.

(Continued)

*Primary Examiner* — Akash Saxena
(74) *Attorney, Agent, or Firm* — ExxonMobil Upstream Research Company, Law Dept.

(57) ABSTRACT

Method for estimating the Hessian of the objective function, times a vector, in order to compute an update in an iterative optimization solution to a partial differential equation such as the wave equation, used for example in full wave field inversion of seismic data. The Hessian times vector operation is approximated as one forward wave propagation (24) and one gradient computation (25) in a modified subsurface model (23). The modified subsurface model may be a linear combination of the current subsurface model (20) and the vector (21) to be multiplied by the Hessian matrix. The forward-modeled data from the modified model are treated as a field measurement in the data residual of the objective function for the gradient computation in the modified model. In model parameter estimation by iterative inversion of geophysical data, the vector in the first iteration may be the gradient of the objective function.

14 Claims, 3 Drawing Sheets

(56) References Cited

U.S. PATENT DOCUMENTS

| | | | |
|---|---|---|---|
| 4,159,463 A | 6/1979 | Silverman | |
| 4,168,485 A | 9/1979 | Payton et al. | |
| 4,545,039 A | 10/1985 | Savit | |
| 4,562,540 A | 12/1985 | Devaney | |
| 4,575,830 A | 3/1986 | Ingram et al. | |
| 4,594,662 A | 6/1986 | Devaney | |
| 4,636,956 A | 1/1987 | Vannier et al. | |
| 4,675,851 A | 6/1987 | Savit et al. | |
| 4,686,654 A | 8/1987 | Savit | |
| 4,707,812 A | 11/1987 | Martinez | |
| 4,715,020 A | 12/1987 | Landrum, Jr. | |
| 4,766,574 A | 8/1988 | Whitmore et al. | |
| 4,780,856 A | 10/1988 | Becquey | |
| 4,823,326 A | 4/1989 | Ward | |
| 4,916,616 A * | 4/1990 | Freedman et al. | 702/13 |
| 4,924,390 A | 5/1990 | Parsons et al. | |
| 4,953,657 A | 9/1990 | Edington | |
| 4,969,129 A | 11/1990 | Currie | |
| 4,982,374 A | 1/1991 | Edington et al. | |
| 5,260,911 A | 11/1993 | Mason et al. | |
| 5,469,062 A | 11/1995 | Meyer, Jr. | |
| 5,583,825 A | 12/1996 | Carrazzone et al. | |
| 5,677,893 A | 10/1997 | de Hoop et al. | |
| 5,715,213 A | 2/1998 | Allen | |
| 5,717,655 A | 2/1998 | Beasley | |
| 5,719,821 A | 2/1998 | Sallas et al. | |
| 5,721,710 A | 2/1998 | Sallas et al. | |
| 5,790,473 A | 8/1998 | Allen | |
| 5,798,982 A | 8/1998 | He et al. | |
| 5,822,269 A | 10/1998 | Allen | |
| 5,838,634 A | 11/1998 | Jones et al. | |
| 5,852,588 A | 12/1998 | de Hoop et al. | |
| 5,878,372 A | 3/1999 | Tabarovsky et al. | |
| 5,920,828 A | 7/1999 | Norris et al. | |
| 5,924,049 A | 7/1999 | Beasley et al. | |
| 5,999,488 A | 12/1999 | Smith | |
| 5,999,489 A | 12/1999 | Lazaratos | |
| 6,014,342 A | 1/2000 | Lazaratos | |
| 6,021,094 A | 2/2000 | Ober et al. | |
| 6,028,818 A | 2/2000 | Jeffryes | |
| 6,058,073 A | 5/2000 | VerWest | |
| 6,125,330 A | 9/2000 | Robertson et al. | |
| 6,219,621 B1 | 4/2001 | Hornbostel | |
| 6,225,803 B1 | 5/2001 | Chen | |
| 6,311,133 B1 | 10/2001 | Lailly et al. | |
| 6,317,695 B1 | 11/2001 | Zhou et al. | |
| 6,327,537 B1 | 12/2001 | Ikelle | |
| 6,374,201 B1 | 4/2002 | Grizon et al. | |
| 6,381,543 B1 | 4/2002 | Guerillot et al. | |
| 6,388,947 B1 | 5/2002 | Washbourne et al. | |
| 6,480,790 B1 | 11/2002 | Calvert et al. | |
| 6,522,973 B1 | 2/2003 | Tonellot et al. | |
| 6,545,944 B2 | 4/2003 | de Kok | |
| 6,549,854 B1 * | 4/2003 | Malinverno et al. | 702/16 |
| 6,574,564 B2 | 6/2003 | Lailly et al. | |
| 6,593,746 B2 | 7/2003 | Stolarczyk | |
| 6,662,147 B1 | 12/2003 | Fournier et al. | |
| 6,665,615 B2 | 12/2003 | Van Riel et al. | |
| 6,687,619 B2 | 2/2004 | Moerig et al. | |
| 6,687,659 B1 | 2/2004 | Shen | |
| 6,704,245 B2 | 3/2004 | Becquey | |
| 6,714,867 B2 | 3/2004 | Meunier | |
| 6,735,527 B1 | 5/2004 | Levin | |
| 6,754,590 B1 | 6/2004 | Moldoveanu | |
| 6,766,256 B2 | 7/2004 | Jeffryes | |
| 6,826,486 B1 | 11/2004 | Malinverno | |
| 6,836,448 B2 | 12/2004 | Robertsson et al. | |
| 6,842,701 B2 | 1/2005 | Moerig et al. | |
| 6,859,734 B2 | 2/2005 | Bednar | |
| 6,865,487 B2 | 3/2005 | Charron | |
| 6,865,488 B2 | 3/2005 | Moerig et al. | |
| 6,876,928 B2 | 4/2005 | Van Riel et al. | |
| 6,882,938 B2 | 4/2005 | Vaage et al. | |
| 6,882,958 B2 | 4/2005 | Schmidt et al. | |
| 6,901,333 B2 | 5/2005 | Van Riel et al. | |
| 6,903,999 B2 | 6/2005 | Curtis et al. | |
| 6,927,698 B2 | 8/2005 | Stolarczyk | |
| 6,944,546 B2 | 9/2005 | Xiao et al. | |
| 6,947,843 B2 | 9/2005 | Fisher et al. | |
| 6,970,397 B2 | 11/2005 | Castagna et al. | |
| 6,977,866 B2 | 12/2005 | Huffman et al. | |
| 6,999,880 B2 | 2/2006 | Lee | |
| 7,027,927 B2 | 4/2006 | Routh et al. | |
| 7,046,581 B2 | 5/2006 | Calvert | |
| 7,050,356 B2 | 5/2006 | Jeffryes | |
| 7,069,149 B2 | 6/2006 | Goff et al. | |
| 7,072,767 B2 | 7/2006 | Routh et al. | |
| 7,092,823 B2 | 8/2006 | Lailly et al. | |
| 7,110,900 B2 | 9/2006 | Adler et al. | |
| 7,184,367 B2 | 2/2007 | Yin | |
| 7,216,004 B2 * | 5/2007 | Kohn et al. | 700/28 |
| 7,230,879 B2 | 6/2007 | Herkenhoff et al. | |
| 7,271,747 B2 | 9/2007 | Baraniuk et al. | |
| 7,330,799 B2 | 2/2008 | Lefebvre et al. | |
| 7,337,069 B2 | 2/2008 | Masson et al. | |
| 7,373,251 B2 | 5/2008 | Hamman et al. | |
| 7,373,252 B2 | 5/2008 | Sherrill et al. | |
| 7,376,046 B2 | 5/2008 | Jeffryes | |
| 7,376,539 B2 | 5/2008 | Lecomte | |
| 7,400,978 B2 | 7/2008 | Langlais et al. | |
| 7,436,734 B2 | 10/2008 | Krohn | |
| 7,480,206 B2 | 1/2009 | Hill | |
| 7,584,056 B2 | 9/2009 | Koren | |
| 7,599,798 B2 | 10/2009 | Beasley et al. | |
| 7,602,670 B2 | 10/2009 | Jeffryes | |
| 7,616,523 B1 | 11/2009 | Tabti et al. | |
| 7,620,534 B2 | 11/2009 | Pita et al. | |
| 7,646,924 B2 | 1/2010 | Donoho | |
| 7,672,194 B2 | 3/2010 | Jeffryes | |
| 7,672,824 B2 | 3/2010 | Dutta et al. | |
| 7,675,815 B2 | 3/2010 | Saenger et al. | |
| 7,679,990 B2 | 3/2010 | Herkenhoff et al. | |
| 7,715,985 B2 | 5/2010 | Van Manen et al. | |
| 7,715,986 B2 | 5/2010 | Nemeth et al. | |
| 7,725,266 B2 | 5/2010 | Sirgue et al. | |
| 7,791,980 B2 | 9/2010 | Robertsson et al. | |
| 7,835,072 B2 | 11/2010 | Izumi | |
| 7,840,625 B2 | 11/2010 | Candes et al. | |
| 7,940,601 B2 | 5/2011 | Ghosh | |
| 8,121,823 B2 | 2/2012 | Krebs et al. | |
| 8,437,219 B2 * | 5/2013 | Chapman et al. | 367/73 |
| 8,498,845 B2 * | 7/2013 | Jing et al. | 703/2 |
| 8,537,638 B2 * | 9/2013 | Lee et al. | 367/73 |
| 8,619,498 B2 * | 12/2013 | Xu et al. | 367/38 |
| 8,694,299 B2 * | 4/2014 | Krebs et al. | 703/10 |
| 8,756,042 B2 * | 6/2014 | Tan et al. | 703/10 |
| 8,768,659 B2 * | 7/2014 | Vasudevan et al. | 703/2 |
| 2002/0099504 A1 | 7/2002 | Cross et al. | |
| 2002/0120429 A1 | 8/2002 | Ortoleva | |
| 2002/0183980 A1 | 12/2002 | Guillaume | |
| 2004/0199330 A1 | 10/2004 | Routh et al. | |
| 2005/0010383 A1 * | 1/2005 | Le Ravalec-Dupin et al. | 703/10 |
| 2006/0235666 A1 | 10/2006 | Assa et al. | |
| 2007/0036030 A1 | 2/2007 | Baumel et al. | |
| 2007/0038691 A1 | 2/2007 | Candes et al. | |
| 2007/0274155 A1 | 11/2007 | Ikelle | |
| 2008/0173104 A1 | 7/2008 | German | |
| 2008/0175101 A1 | 7/2008 | Saenger et al. | |
| 2008/0306692 A1 | 12/2008 | Singer et al. | |
| 2009/0067041 A1 | 3/2009 | Krauklis et al. | |
| 2009/0070042 A1 | 3/2009 | Birchwood et al. | |
| 2009/0083006 A1 * | 3/2009 | Mackie | 703/1 |
| 2009/0164186 A1 | 6/2009 | Haase et al. | |
| 2009/0164756 A1 | 6/2009 | Dokken et al. | |
| 2009/0187391 A1 | 7/2009 | Wendt et al. | |
| 2009/0248308 A1 | 10/2009 | Luling | |
| 2009/0254320 A1 | 10/2009 | Lovatini et al. | |
| 2009/0259406 A1 | 10/2009 | Khadhraoui et al. | |
| 2009/0259447 A1 | 10/2009 | Langemyr et al. | |
| 2010/0008184 A1 | 1/2010 | Hegna et al. | |
| 2010/0018718 A1 | 1/2010 | Krebs et al. | |
| 2010/0039894 A1 | 2/2010 | Abma et al. | |
| 2010/0054082 A1 | 3/2010 | McGarry et al. | |
| 2010/0088035 A1 | 4/2010 | Etgen et al. | |

(56) References Cited

U.S. PATENT DOCUMENTS

| | | | |
|---|---|---|---|
| 2010/0103772 A1 | 4/2010 | Eick et al. | |
| 2010/0118651 A1 | 5/2010 | Liu et al. | |
| 2010/0142316 A1* | 6/2010 | Keers et al. | 367/15 |
| 2010/0161233 A1 | 6/2010 | Saenger et al. | |
| 2010/0161234 A1 | 6/2010 | Saenger et al. | |
| 2010/0185422 A1 | 7/2010 | Hoversten | |
| 2010/0202250 A1* | 8/2010 | Kitchenside et al. | 367/21 |
| 2010/0208554 A1 | 8/2010 | Chiu et al. | |
| 2010/0212909 A1 | 8/2010 | Baumstein et al. | |
| 2010/0265797 A1 | 10/2010 | Robertsson et al. | |
| 2010/0270026 A1 | 10/2010 | Lazaratos et al. | |
| 2010/0286919 A1 | 11/2010 | Lee et al. | |
| 2010/0299070 A1 | 11/2010 | Abma | |
| 2011/0000678 A1 | 1/2011 | Krebs et al. | |
| 2011/0016065 A1* | 1/2011 | Chapelle et al. | 706/12 |
| 2011/0040926 A1 | 2/2011 | Donderici et al. | |
| 2011/0051553 A1 | 3/2011 | Scott et al. | |
| 2011/0090760 A1* | 4/2011 | Rickett et al. | 367/73 |
| 2011/0103187 A1* | 5/2011 | Albertin et al. | 367/73 |
| 2011/0131020 A1 | 6/2011 | Meng | |
| 2011/0134722 A1 | 6/2011 | Virgilio et al. | |
| 2011/0182141 A1 | 7/2011 | Zhamikov et al. | |
| 2011/0182144 A1 | 7/2011 | Gray | |
| 2011/0191032 A1 | 8/2011 | Moore | |
| 2011/0194379 A1* | 8/2011 | Lee et al. | 367/73 |
| 2011/0222370 A1 | 9/2011 | Downton et al. | |
| 2011/0227577 A1 | 9/2011 | Zhang et al. | |
| 2011/0235464 A1 | 9/2011 | Brittan et al. | |
| 2011/0238390 A1 | 9/2011 | Krebs et al. | |
| 2011/0246140 A1 | 10/2011 | Abubakar et al. | |
| 2011/0267921 A1 | 11/2011 | Mortel et al. | |
| 2011/0267923 A1* | 11/2011 | Shin | 367/49 |
| 2011/0276320 A1 | 11/2011 | Krebs et al. | |
| 2011/0288831 A1* | 11/2011 | Tan et al. | 703/2 |
| 2012/0014215 A1 | 1/2012 | Saenger et al. | |
| 2012/0014216 A1 | 1/2012 | Saenger et al. | |
| 2012/0051176 A1 | 3/2012 | Liu | |
| 2012/0051179 A1* | 3/2012 | Shin | 367/50 |
| 2012/0051180 A1* | 3/2012 | Shin | 367/50 |
| 2012/0051182 A1* | 3/2012 | Shin | 367/59 |
| 2012/0073824 A1 | 3/2012 | Routh | |
| 2012/0073825 A1 | 3/2012 | Routh | |
| 2012/0075954 A1* | 3/2012 | Xu et al. | 367/38 |
| 2012/0082344 A1 | 4/2012 | Donoho | |
| 2012/0143506 A1* | 6/2012 | Routh et al. | 702/2 |
| 2013/0138408 A1* | 5/2013 | Lee et al. | 703/2 |
| 2013/0311149 A1* | 11/2013 | Tang et al. | 703/2 |
| 2014/0301158 A1* | 10/2014 | Zhang et al. | 367/7 |
| 2014/0355375 A1* | 12/2014 | Zuberi et al. | 367/7 |

FOREIGN PATENT DOCUMENTS

| | | |
|---|---|---|
| GB | 2 390 712 | 1/2004 |
| GB | 2 391 665 | 2/2004 |
| WO | WO 2006/037815 | 4/2006 |
| WO | WO 2007/046711 | 4/2007 |
| WO | WO 2008/042081 | 4/2008 |
| WO | WO 2008/123920 | 10/2008 |
| WO | WO 2009/067041 | 5/2009 |
| WO | WO 2009/117174 | 9/2009 |
| WO | WO 2011/040926 | 4/2011 |
| WO | WO 2011/091216 | 7/2011 |
| WO | WO 2011/093945 | 8/2011 |

OTHER PUBLICATIONS

Griewank, A. (2000), Evaluating Derivatives: Principles and Techniques of Algorithmic Differentiation, Society for Industrial and Applied Mathematics, 49 pgs.

Griewank, A. et al. (2000), "Algorithm 799: An implementation of checkpointing for the reverse or adjoint mode of computational differentiation," 26 *ACM Transactions on Mathematical Software*, pp. 19-45.

Griewank, A. et al. (1996), "Algorithm 755: A package for the automatic differentiation of algorithms written in C/C++," *ACM Transactions on Mathematical Software* 22(2), pp. 131-167.

Haber, E. et al. (2010), "An effective method for parameter estimation with PDE constraints with multiple right hand sides," Preprint—UBC http://www.math.ubc.ca/~haber/pubs/PdeOptStochV5.pdf.

Helbig, K. (1994), "Foundations of Anisotropy for Exploration Seismics," Chapter 5, pp. 185-194.

Herrmann, F.J. (2010), "Randomized dimensionality reduction for full-waveform inversion," *EAGE abstract* G001, EAGE Barcelona meeting, 5 pgs.

Holschneider, J. et al. (2005), "Characterization of dispersive surface waves using continuous wavelet transforms," *Geophys. J. Int.* 163, pp. 463-478.

Hu, L.Z. et al. (1987), "Wave-field transformations of vertical seismic profiles," *Geophysics* 52, pp. 307-321.

Huang, Y. et al. (2012), "Multisource least-squares migration of marine streamer and land data with frequency-division encoding," *Geophysical Prospecting* 60, pp. 663-680.

Igel, H. et al. (1996), "Waveform inversion of marine reflection seismograms for P impedance and Poisson's ratio," *Geophys. J. Int.* 124, pp. 363-371.

Ikelle, L.T. (2007), "Coding and decoding: Seismic data modeling, acquisition, and processing," 77th Annual Int'l. Meeting, SEG Expanded Abstracts, pp. 66-70.

Jackson, D.R. et al. (1991), "Phase conjugation in underwater acoustics," *J. Acoust. Soc. Am.* 89(1), pp. 171-181.

Jing, X. et al. (2000), "Encoding multiple shot gathers in prestack migration," *SEG International Exposition and $70^{th}$ Annual Meeting Expanded Abstracts*, pp. 786-789.

Kennett, B.L.N. (1991), "The removal of free surface interactions from three-component seismograms", *Geophys. J. Int.* 104, pp. 153-163.

Krebs, J.R. (2008), "Fast Full-wavefield seismic inversion using encoded sources," *Geophysics* 74(6), pp. WCC177-WCC188.

Krohn, C.E. (1984), "Geophone ground coupling," *Geophysics* 49(6), pp. 722-731.

Kroode, F.T. et al. (2009), "Wave Equation Based Model Building and Imaging in Complex Settings," OTC 20215, 2009 Offshore Technology Conf., Houston, TX, May 4-7, 2009, 8 pgs.

Kulesh, M. et al. (2008), "Modeling of Wave Dispersion Using Continuous Wavelet Transforms II: Wavelet-based Frequency-velocity Analysis," *Pure Applied Geophysics* 165, pp. 255-270.

Lancaster, S. et al. (2000), "Fast-track 'colored' inversion," $70^{th}$ SEG Ann. Meeting, *Expanded Abstracts*, pp. 1572-1575.

Lazaratos, S. et al. (2009), "Inversion of Pre-migration Spectral Shaping," 2009 SEG Houston Int'l. Expo. & Ann. Meeting, *Expanded Abstracts*, pp. 2383-2387.

Lazaratos, S. (2006), "Spectral Shaping Inversion for Elastic and Rock Property Estimation," *Research Disclosure*, Issue 511, pp. 1453-1459.

Lazaratos, S. et al. (2011), "Improving the convergence rate of full wavefield inversion using spectral shaping," *SEG Expanded Abstracts* 30, pp. 2428-2432.

Lecomte, I. (2008), "Resolution and illumination analyses in PSDM: A ray-based approach," The Leading Edge, pp. 650-663.

Lee, S. et al. (2010), "Subsurface parameter estimation in full wavefield inversion and reverse time migration," SEG Denver 2010 Annual Meeting, pp. 1065-1069.

Levanon, N. (1988), "Radar Principles," Chpt. 1, John Whiley & Sons, New York, pp. 1-18.

Liao, Q. et al. (1995), "2.5D full-wavefield viscoacoustic inversion," *Geophysical Prospecting* 43, pp. 1043-1059.

Liu, F. et al. (2007), "Reverse-time migration using one-way wavefield imaging condition," *SEG Expanded Abstracts* 26, pp. 2170-2174.

Liu, F. et al. (2011), "An effective imaging condition for reverse-time migration using wavefield decomposition," *Geophysics* 76, pp. S29-S39.

Maharramov, M. et al. (2007), "Localized image-difference wave-equation tomography," SEG Annual Meeting, *Expanded Abstracts*, pp. 3009-3013.

(56) References Cited

OTHER PUBLICATIONS

Malmedy, V. et al. (2009), "Approximating Hessians in unconstrained optimization arising from discretized problems," *Computational Optimization and Applications*, pp. 1-16.

Marcinkovich, C. et al. (2003), "On the implementation of perfectly matched layers in a three-dimensional fourth-order velocity-stress finite difference scheme," *J. of Geophysical Research* 108(B5), 2276.

Martin, G.S. et al. (2006), "Marmousi2: An elastic upgrade for Marmousi," *The Leading Edge*, pp. 156-166.

Meier, M.A. et al. (2009), "Converted wave resolution," Geophysics, 74(2):doi:10.1190/1.3074303, pp. Q1-Q16.

Moghaddam, P.P. et al. (2010), "Randomized full-waveform inversion: a dimenstionality-reduction approach," $80^{th}$ SEG Ann. Meeting, *Expanded Abstracts*, pp. 977-982.

Mora, P. (1987), "Nonlinear two-dimensional elastic inversion of multi-offset seismic data," *Geophysics* 52, pp. 1211-1228.

Tang, Y. et al. (2010), "Preconditioning full waveform inversion with phase-encoded Hessian," *SEG Expanded Abstracts* 29, pp. 1034-1037.

Tarantola, A. (1984), "Inversion of seismic reflection data in the acoustic approximation," *Geophysics* 49, pp. 1259-1266.

Tarantola, A. (1986), "A strategy for nonlinear elastic inversion of seismic reflection data," *Geophysics* 51(10), pp. 1893-1903.

Tarantola, A. (1988), "Theoretical background for the inversion of seismic waveforms, including elasticity and attenuation," *Pure and Applied Geophysics* 128, pp. 365-399.

Tarantola, A. (2005), "Inverse Problem Theory and Methods for Model Parameter Estimation," *SIAM*, pp. 79.

Trantham, E.C. (1994), "Controlled-phase acquisition and processing," *SEG Expanded Abstracts* 13, pp. 890-894.

Tsvankin, I. (2001), "Seismic Signatures and Analysis of Reflection Data in Anisotropic Media," Elsevier Science, p. 8.

van Manen, D.J. (2005), "Making wave by time reversal," SEG International Exposition and $75^{th}$ Annual Meeting, *Expanded Abstracts*, pp. 1763-1766.

van Groenestijn, G.J.A. et al. (2009), "Estimating primaries by sparse inversion and application to near-offset reconstruction," *Geophyhsics* 74(3), pp. A23-A28.

Verschuur, D.J. (2009), Target-oriented, least-squares imaging of blended data, 79th Annual Int'l. Meeting, *SEG Expanded Abstracts*, pp. 2889-2893.

Verschuur, D.J. et al. (1992), "Adaptive surface-related multiple elimination," *Geophysics* 57(9), pp. 1166-1177.

Verschuur, D.J. (1989), "Wavelet Estimation by Prestack Multiple Elimination," *SEG Expanded Abstracts* 8, pp. 1129-1132.

Vigh, D. et al. (2008), "3D prestack plane-wave, full-waveform inversion," *Geophysics* 73(5), pp. VE135-VE144.

Wang, Y. (2007), "Multiple prediction through inversion: Theoretical advancements and real data application," Geophysics 72(2), pp. V33-V39.

Wang, K. et al. (2009), "Simultaneous full-waveform inversion for source wavelet and earth model," SEG Int'l. Expo. & Ann. Meeting, Expanded Abstracts, pp. 2537-2541.

Weglein, A.B. (2003), "Inverse scattering series and seismic exploration," *Inverse Problems* 19, pp. R27-R83.

Wu R-S. et al. (2006), "Directional illumination analysis using beamlet decomposition and propagation," *Geophysics* 71(4), pp. S147-S159.

Xia, J. et al. (2004), "Utilization of high-frequency Rayleigh waves in near-surface geophysics," *The Leading Edge*, pp. 753-759.

Xie, X. et al. (2002), "Extracting angle domain information from migrated wavefield," *SEG Expanded Abstracts* 21, pp. 1360-1363.

Xie, X.-B. et al. (2006), "Wave-equation-based seismic illumination analysis," *Geophysics* 71(5), pp. S169-S177.

Yoon, K. et al. (2004), "Challenges in reverse-time migration," *SEG Expanded Abstracts* 23, pp. 1057-1060.

Young, J. et al. (2011), "An application of random projection to parameter estimation in partial differential equations," SIAM, 20 pgs.

Zhang, Y. (2005), "Delayed-shot 3D depth migration," *Geophysics* 70, pp. E21-E28.

Ziolkowski, A. (1991), "Why don't we measure seismic signatures?," *Geophysics* 56(2), pp. 190-201.

Mora, P. (1987), "Elastic Wavefield Inversion," PhD Thesis, Stanford University, pp. 22-25.

Mora, P. (1989), "Inversion=migration+tomography," *Geophysics* 64, pp. 888-901.

Nazarian, S. et al. (1983), "Use of spectral analysis of surface waves method for determination of moduli and thickness of pavement systems," *Transport Res. Record* 930, pp. 38-45.

Neelamani, R., (2008), "Simultaneous sourcing without compromise," 70th Annual Int'l. Conf. and Exh., EAGE, 5 pgs.

Neelamani, R. (2009), "Efficient seismic forward modeling using simultaneous sources and sparsity," *SEG Expanded Abstracts*, pp. 2107-2111.

Nocedal, J. et al. (2006), "*Numerical Optimization, Chapt. 7—Large-Scale Unconstrained Optimization*," Springer, New York, $2^{nd}$ Edition, pp. 165-176.

Ostmo, S. et al. (2002), "Finite-difference iterative migration by linearized waveform inversion in the frequency domain," SEG Int'l. Expo. & $72^{nd}$ Ann. Meeting, 4 pgs.

Plessix, R.E. et al. (2004), "Frequency-domain finite-difference amplitude preserving migration," *Geophys. J. Int.* 157, pp. 975-987.

Park, C.B. et al. (1999), "Multichannel analysis of surface waves," *Geophysics* 64(3), pp. 800-808.

Park, C.B. et al. (2007), "Multichannel analysis of surface waves (MASW)—active and passive methods," *The Leading Edge*, pp. 60-64.

Pica, A. et al. (2005), "3D Surface-Related Multiple Modeling, Principles and Results," 2005 SEG Ann. Meeting, *SEG Expanded Abstracts* 24, pp. 2080-2083.

Porter, R.P. (1989), "Generalized holography with application to inverse scattering and inverse source problems," In E. Wolf, editor, Progress in Optics XXVII, Elsevier, pp. 317-397.

Pratt, R.G. et al. (1998), "Gauss-Newton and full Newton methods in frequency-space seismic waveform inversion," *Geophys. J Int.* 133, pp. 341-362.

Pratt, R.G. (1999), "Seismic waveform inversion in the frequency domain, Part 1: Theory and verification in a physical scale model," *Geophysics* 64, pp. 888-901.

Rawlinson, N. et al. (2008), "A dynamic objective function technique for generating multiple solution models in seismic tomography," *Geophys. J. Int.* 178, pp. 295-308.

Rayleigh, J.W.S. (1899), "On the transmission of light through an atmosphere containing small particles in suspension, and on the origin of the blue of the sky," Phil. Mag. 47, pp. 375-384.

Romero, L.A. et al. (2000), Phase encoding of shot records in prestack migration, *Geophysics* 65, pp. 426-436.

Ryden, N. et al. (2006), "Fast simulated annealing inversion of surface waves on pavement using phase-velocity spectra," *Geophysics* 71(4), pp. R49-R58.

Routh, P. et al. (2011), "Encoded Simultaneous Source Full-Wavefield Inversion for Spectrally-Shaped Marine Streamer Data," SEG San Antonio 2011 Ann. Meeting, pp. 2433-2438.

Schuster, G.T. et al. (2010), "Theory of Multisource Crosstalk Reduction by Phase-Encoded Statics," SEG Denver 2010 Ann. Meeting, pp. 3110-3114.

Sheen, D-H. et al. (2006), "Time domain Gauss-Newton seismic waveform inversion in elastic media," Geophysics J. Int. 167, pp. 1373-1384.

Shen, P. et al. (2003), "Differential semblance velocity analysis by wave-equation migration," $73^{rd}$ Ann. Meeting of Society of Exploration Geophysicists, 4 pgs.

Sheng, J. et al. (2006), "Early arrival waveform tomography on near-surface refraction data," *Geophysics* 71, pp. U47-U57.

Sheriff, R.E. et al. (1982), "*Exploration Seismology*", pp. 134-135.

Shih, R-C. et al. (1996), "Iterative pre-stack depth migration with velocity analysis," *Terrestrial, Atmospheric & Oceanic Sciences* 7(2), pp. 149-158.

Simard, P.Y. et al. (1990), "Vector Field Restoration by the Method of Convex Projections," *Computer Vision, Graphics and Image Processing* 52, pp. 360-385.

Shin, C. et al. (2001), "Waveform inversion using a logarithmic wavefield," *Geophysics* 49, pp. 592-606.

(56) References Cited

OTHER PUBLICATIONS

Sirgue, L. (2004), "Efficient waveform inversion and imaging: A strategy for selecting temporal frequencies," *Geophysics* 69, pp. 231-248.
Spitz, S. (2008), "Simultaneous source separation: a prediction-subtraction approach," 78th Annual Int'l. Meeting, *SEG Expanded Abstracts*, pp. 2811-2815.
Stefani, J. (2007), "Acquisition using simultaneous sources," 69th Annual Conf. and Exh., *EAGE Extended Abstracts*, 5 pgs.
Symes, W.W. (2007), "Reverse time migration with optimal checkpointing," *Geophysics* 72(5), pp. P.SM213-SM221.
Tang, Y. (2008), "Wave-equation Hessian by phase encoding," *SEG Expanded Abstracts* 27, pp. 2201-2205.
Tang, Y. (2009), "Target-oriented wave-equation least-squares migration/inversion with phase-encoded Hessian," *Geophysics* 74, pp. WCA95-WCA107.
Abt, D.L. et al. (2010), "North American lithospheric discontinuity structured imaged by Ps And Sp receiver functions", *J. Geophys. Res.*, 24 pgs.
Akerberg, P., et al. (2008), "Simultaneous source separation by sparse radon transform," 78th SEG Annual International Meeting, *Expanded Abstracts*, pp. 2801-2805.
Aki, K. et al. (1980), "Quantitative Seismology: Theory and Methods Volume I—Chapter 7—Surface Waves in a Vertically Heterogenous Medium," W.H. Freeman and Co., pp. 259-318.
Aki, K. et al. (1980), "Quantitative Seismology: Theory and Methods Volume I," W.H. Freeman and Co., p. 173.
Anderson, J.E. et al. (2008), "Sources Near the Free-Surface Boundary: Pitfalls for Elastic Finite-Difference Seismic Simulation and Multi-Grid Waveform Inversion," 70$^{th}$ EAGE Conf. & Exh., 4 pgs.
Baumstein, A. et al. 2009), "Scaling of the Objective Function Gradient for Full Wavefield Inversion," SEG Houston 2009 Int'l. Expo and Annual Meeting, pp. 224-2247.
Beasley, C. (2008), "A new look at marine simultaneous sources," *The Leading Edge* 27(7), pp. 914-917.
Beaty, K.S. et al. (2003), "Repeatability of multimode Rayleigh-wave dispersion studies," *Geophysics* 68(3), pp. 782-790.
Beaty, K.S. et al. (2002). "Simulated annealing inversion of multimode Rayleigh wave dispersion waves for geological structure," *Geophys. J Int.* 151, pp. 622-631.
Becquey, M. et al. (2002). "Pseudo-Random Coded Simultaneous Vibroseismics," SEG Int'l. Exposition and 72th Annl. Mtg., 4 pgs.
Berkhout, A.J. (1987), "Applied Seismic Wave Theory," Elsevier Science Publishers, p. 142.
Berkhout, A.J. (1992), "Areal shot record technology," *Journal of Seismic Exploration* 1, pp. 251-264.
Berkhout, A.J. (2008), "Changing the mindset in seismic data acquisition," *The Leading Edge* 27(7), pp. 924-938.
Ben-Hadj-Ali, H. et al. (2009), "Three-dimensional frequency-domain full waveform inversion with phase encoding" *SEG Expanded Abstracts*, pp. 2288-2292.

Beylkin, G. (1985), "Imaging of discontinuities in the inverse scattring problem by inversion of a causal generalized Radon transform," *J. Math. Phys.* 26, pp. 99-108.
Bonomi, E. et al. (2006), "Wavefield Migration plus Monte Carlo Imaging of 3D Prestack Seismic Data," *Geophysical Prospecting* 54, pp. 505-514.
Boonyasiriwat, C. et al, (2010), 3D Multisource Full-Waveform using Dynamic Random Phase Encoding, SEG Denver 2010 Annual Meeting, pp. 1044-1049.
Boonyasiriwat, C. et al, (2010), 3D Multisource Full-Waveform using Dynamic Random Phase Encoding, SEG Denver 2010 Annual Meeting, pp. 3120-3124.
Bunks, C., et al. (1995), "Multiscale seismic waveform inversion," *Geophysics* 60, pp, 1457-1473.
Burstedde, G. et al. (2009), "Algorithmic strategies for full waveform inversion: 1D experiments," *Geophysics* 74(6), pp. WCC17-WCC46.
Chavent, G. et al. (1999), "An optimal true-amplitude least-squares prestack depth-migration operator," *Geophysics* 64(2), pp. 508-515.
Clapp, R.G. (2009), "Reverse time migration with random boundaries," SEG International Exposition and Meeting, *Expanded Abstracts*, pp. 2809-2813.
Dai, W. et al. (2010), "3D Multi-source Least-squares Reverse Time Migration," SEG Denver 2010 Annual Meeting, pp. 3120-3124.
Delprat-Jannuad, F. et al. (2005), "A fundamental limitation for the reconstruction of impedance profiles from seismic data," *Geophysics* 70(1), pp. R1-R14.
Dickens, T.A. et al, (2011), RTM angle gathers using Poynting vectors, *SEG Expanded Abstracts* 30, pp. 3109-3113.
Dunkin, J.W. et al. (1973), "Effect of Normal Moveout on a Seismic Pluse," *Geophysics* 38(4), pp. 635-642.
Dziewonski A. et al. (1981), "Preliminary Reference Earth Model", *Phys. Earth Planet. Int.* 25(4), pp. 297-356.
Ernst, F.E. et al. (2000), "Tomography of dispersive media," *J. Acoust. Soc. Am* 108(1), pp. 105-116.
Ernst, F.E. et al. (2002), "Removal of scattered guided waves from seismic data," *Geophysics* 67(4), pp. 1240-1248.
Esmersoy, C. (1990), "Inversion of P and SV waves from multicomponent offset vertical seismic profiles", *Geophysics* 55(1), pp, 39-50.
Fallat, M.R. et al. (1999), "Geoacoustic inversion via local, global, and hybrid algorithms," *Journal of Acoustical Society of America* 105, pp. 3219-3230.
Fichtner, A. et al. (2006). "The adjoint method in seismology I. Theory," *Physics of the Earth and Planetary Interiors* 157, pp. 86-104.
Forbriger, T. (2003), "Inversion of shallow-seismic wavefields: I. Wavefield transformation," *Geophys. J. Int.* 153, pp. 719-734.
Gibson, B. et al. (1984), "Predictive deconvolution and the zero-phase source," *Geophysics* 49(4), pp. 379-397.
Griewank, A. (1992), "Achieving logarithmic growth of temporal and spatial complexity in reverse automatic differentiation," 1 *Optimization Methods and Software*, pp. 35-54.

\* cited by examiner

METHODS FOR APPROXIMATING HESSIAN TIMES VECTOR OPERATION IN FULL WAVEFIELD INVERSION

CROSS-REFERENCE TO RELATED APPLICATION

This application claims the benefit of U.S. Provisional Patent Application 61/564,669, filed Nov. 29, 2011 entitled METHODS FOR APPROXIMATING HESSIAN TIMES VECTOR OPERATION IN FULL WAVEFIELD INVERSION, the entirety of which is incorporated by reference herein.

FIELD OF THE INVENTION

This invention relates generally to the field of geophysical prospecting and, more particularly, to seismic data processing. Specifically, the invention is a method for faster estimation of a quantity known as Hessian times vector which arises in certain methods for numerical solving of partial differential equations, for example iterative inversion of seismic data to infer elastic properties of a medium, involving forward modeling of synthetic data by solving the wave equation in a model medium.

BACKGROUND OF THE INVENTION

Full wavefield inversion (FWI) in exploration seismic processing relies on the calculation of the gradient of an objective function with respect to the subsurface model parameters [9]. The gradient of the objective function is used to calculate an update to the model. An objective function E is usually given as an $L_2$ norm as $$E = \frac{1}{2} \int \int \int |p(r_g, r_s; t) - p_b(r_g, r_s; t)|^2 dt \, dS_g \, dS_s, \quad (1)$$

where $p$ and $p_b$ are the measured pressure, i.e. seismic amplitude, and the modeled pressure in the background subsurface model at the receiver location $r_g$ for a shot located at $r_s$. In iterative inversion processes, the background medium is typically the medium resulting from the previous inversion cycle. In non-iterative inversion processes or migrations, the background medium is typically derived using conventional seismic processing techniques such as migration velocity analysis. The objective function is integrated over all time t, and the surfaces $S_g$ and $S_s$ that are defined by the spread of the receivers and the shots. We define $K_d(r) = K(r) - K_b(r)$ and $\rho_d(r) = \rho(r) - \rho_b(r)$, where $K(r)$ and $\rho(r)$ are the true bulk modulus and density, and $K_b(r)$ and $\rho_b(r)$ are the bulk modulus and the density of the background model at the subsurface location r. (Bulk modulus is used as an example here, but any of the 21 elastic constants might be used instead.) We also define the difference between the measured and the modeled pressure to be $p_d(r_g, r_s; t) = p(r_g, r_s; t) - p_b(r_g, r_s; t)$.

The measured pressure p, satisfies the wave equation $$\rho \nabla \cdot \left(\frac{1}{\rho} \nabla p\right) - \frac{\rho}{K} \ddot{p} = -q(t)\delta(r - r_s), \quad (2)$$

where q(t) is the source signature. It can be shown that the gradient of the objective function E with respect to the bulk modulus $K_b(r)$, for example, is given as $$\frac{\partial E}{\partial K_b(r)} = -\int \int \int p_d \frac{\partial p_b}{\partial K_b(r)} dt \, dS_g \, dS_s \quad (3)$$

$$= -\frac{\rho_b(r) dV}{K_b^2(r)} \int \int \dot{p}_b(r, r_s; t) \int \frac{\rho_b(r_g)}{\rho_b(r)} g_b(r, r_g; -t) * \dot{p}_d(r_g, r_s; t) dS_g \, dt \, dS_s,$$

where $g_b$ is the Green's function in the background medium, and dV is an infinitesimal volume around r [9, 3]. The equations for the gradients of other subsurface medium parameters in general elastic cases can be found in Refs. [10, 6, 1]. One can then perform full wavefield inversion by minimizing the value of the objective function E in an iterative manner, using gradient equations for the medium parameters such as that in Eq. 3.

The convergence rate of full wavefield inversion can be improved when information on the Hessian of the objective function E is employed in the inversion process [7, 5]. The Hessian is a matrix of second partial derivatives of a function. The Hessian (with respect to the physical property bulk modulus) of the objective function E in Eq. 1 is given as $$\frac{\partial^2 E}{\partial K_b(r) \partial K_b(r')} = \quad (4)$$

$$\int \int \int \left[\frac{\partial p_d}{\partial K_b(r)} \frac{\partial p_d}{\partial K_b(r')} + p_d \frac{\partial^2 p_d}{\partial K_b(r) \partial K_b(r')}\right] dt \, dS_s \, dS_g.$$

The second term in the right-hand side is the term responsible for multiple scattering, and is often ignored due to difficulty in evaluation [11]. By dropping this second term, one obtains the equation for the Gauss-Newton Hessian, $$\frac{\partial^2 E}{\partial K_b(r) \partial K_b(r')} \approx \int \int \int \frac{\partial p_d}{\partial K_b(r)} \frac{\partial p_d}{\partial K_b(r')} dt \, dS_s \, dS_g. \quad (5)$$

Once the Hessian matrix is computed, the medium parameter update required for the minimization of E can be obtained by multiplying the inverse of the Hessian matrix and the gradient using the Newton's method [5]:

$$K_d(r) = -\left(\frac{\partial^2 E}{\partial K_b(r) \partial K_b(r')}\right)^{-1} \cdot \frac{\partial E}{\partial K_b(r)}$$

Direct computation of the inverse of the Hessian matrix, however, often requires prohibitively large memory space in full wavefield inversion, and so the inverse of the Hessian is computed iteratively using the conjugate gradient (CG) method. This iterative scheme is often referred to as Newton-CG method, which may be used on either the full Hessian from equation 4 or the Gauss-Newton Hessian from equation 5. An example of this Newton-CG method can be found in Algorithm 7.1 of Ref [5], which is reproduced below. For notational convenience, we use H for the Hessian matrix, and $\nabla E$ for the gradient vector.

1. Define tolerance $\delta = \min(0.5, \sqrt{\|\nabla E\|}) \|\nabla E\|$
2. Set $z_0 = 0$, $r_0 = \nabla E$, $\tilde{K}_0 = -\nabla E$
3. For j = 0, 1, 2,...
   a. If $\tilde{K}_j^T H \tilde{K}_j \leq 0$ -continued i. If j = 0
        1. Return $K_d = -\nabla E$
    ii. Else
        1. Return $K_d = z_j$
  b. Set $l_j = r_j^T r_j / \tilde{K}_j^T H \tilde{K}_j$
  c. Set $z_{j+1} = z_j + l_j d_j$
  d. Set $r_{j+1} = r_j + l_j H \tilde{K}_j$
  e. If $\|r_{j+1}\| < \delta$
    i. Return $K_d = z_{j+1}$
  f. Set $\beta_{j+1} = r_{j+1}^T r_{j+1} / r_j^T r_j$
  g. Set $\tilde{K}_{j+1} = -r_{j+1} + \beta_{j+1} \tilde{K}_j$
4. Perform line search using $K_d$ as the search direction for the medium parameter update, starting with the step size of 1 if possible.

The algorithm above requires repeated evaluation of the Hessian times vector $H\tilde{K}_j$ in a loop, where $\tilde{K}_j$ for j=0 is set as the negative of the gradient. The value of $H\tilde{K}_j$ is then used to update $z_j$, which eventually becomes the inverse of the Hessian times gradient $K_d$ in 3.a.ii.1 or 3.e.i.

The Newton-CG method requires evaluation of the Hessian matrix times (i.e. multiplied by) a medium perturbation vector $\tilde{K}$, which may be referred to hereafter in this document as the (Gauss-Newton) "Hessian times vector,"

$$\int \frac{\partial^2 E}{\partial K_b(r) \partial K_b(r')} \tilde{K}(r') dV = \int \left[ \int \int \int \frac{\partial p_d}{\partial K_b(r)} \frac{\partial p_d}{\partial K_b(r')} dt dS_s dS_g \right] \tilde{K}(r') dV' \quad (6)$$

$$= \int \int \int \frac{\partial p_d}{\partial K_b(r)} \left[ \int \frac{\partial p_d}{\partial K_b(r')} \tilde{K}(r') dV' \right] dt dS_s dS_g,$$

where the Hessian has been approximated as the Gauss-Newton Hessian. For example, in the estimation of parameters of a physical property model by iterative inversion of geophysical data, the medium perturbation vector will typically initially be the gradient (in model parameter space) of the objective function. As the iterations progress, this vector will gradually diverge from being the gradient, and lose physical meaning as such. Equation (6) may be evaluated by performing two forward-wave-propagation and two reverse-wave-propagation computations. The present invention is a method that allows this equation to be evaluated by performing only one forward-wave-propagation (one forward solve of a partial differential equation, such as the wave equation) and one reverse-wave-propagation computation (i.e., one gradient computation of the objective function), resulting in valuable saving of computer time.

SUMMARY OF THE INVENTION

In one embodiment, the invention is a method for determining a discrete physical properties model of a subsurface region, which may be referred to as the "model," by iteratively inverting measured geophysical data acquired from the subsurface region, comprising using a Hessian matrix of an objective function, then times a vector, called "Hessian times vector," to determine an update for the model, wherein the Hessian times vector is approximated, using a computer, with a single forward-wave simulated propagation and a single computation of gradient of the objective function, in a modified subsurface model.

BRIEF DESCRIPTION OF THE DRAWINGS

The present invention and its advantages will be better understood by referring to the following detailed description and the attached drawings in which.

Figure 1:
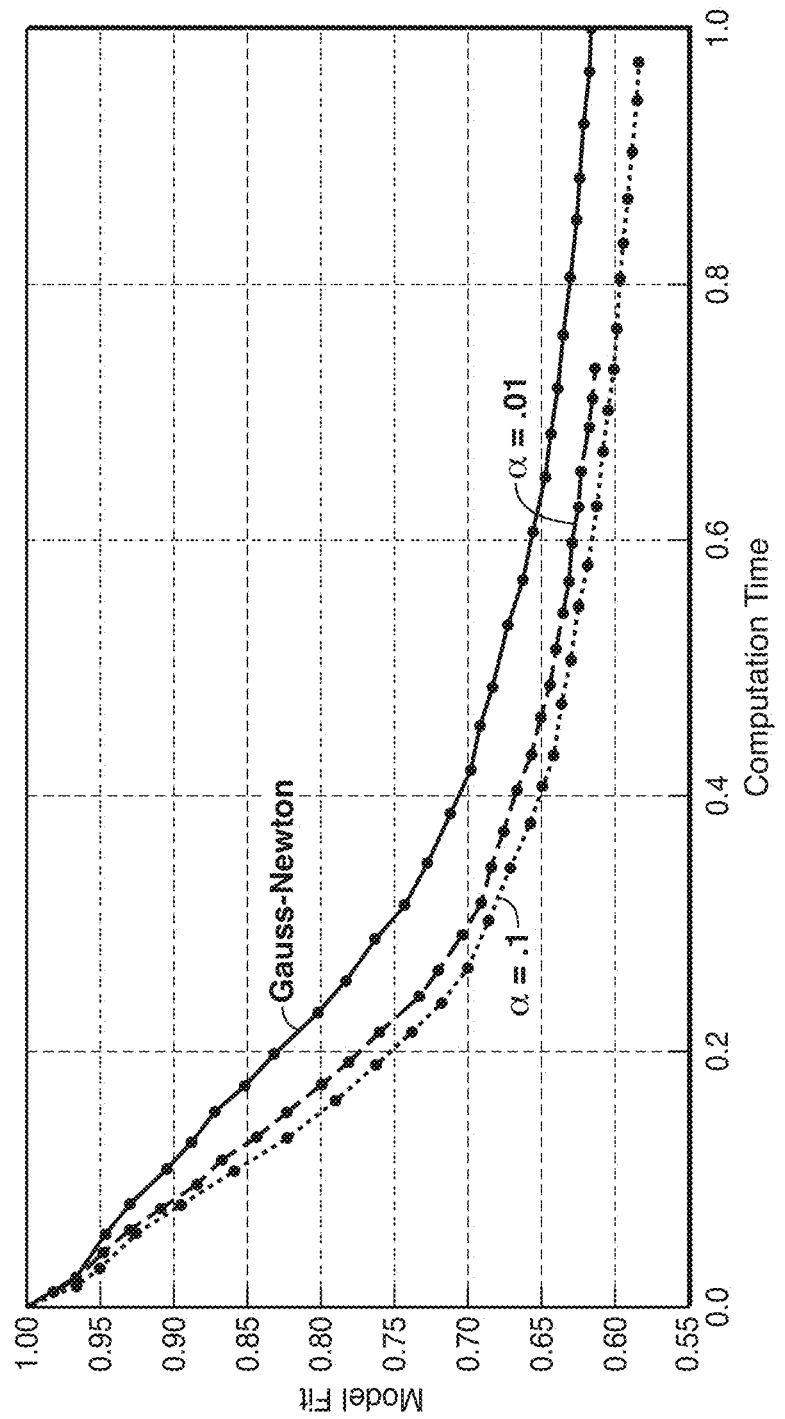
FIG. 1 is a graph comparing the convergence rate of full waveform inversion using the present inventive method as compared to the traditional method for estimating the Hessian times vector, in the test example using the models from FIGS. 3A and 3B.

The invention will be described in connection with example embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims. Persons skilled in the technical field will readily recognize that all practical applications of the present inventive method are performed using a computer programmed according to the disclosure herein.

DETAILED DESCRIPTION OF EXAMPLE EMBODIMENTS

Let $$\int \frac{\partial p_d(r_g, r_s; t)}{\partial K_b(r')} \tilde{K}(r') dV' = -\int \frac{\partial p_b(r_g, r_s; t)}{\partial K_b(r')} \tilde{K}(r') dV' \quad (7)$$

$$= -\int \frac{\rho dV}{K_b^2(r')} [g_b(r_g, r'; t) * p_b(r', r_s; t)] \tilde{K}(r') dV'$$

$$= -\tilde{p}_d(r_g, r_s; t).$$

It may be noted that Eq. 7 is the equation for the Born scattered field $\tilde{p}_d$, where $\tilde{K}$ behaves as a scatterer distribution in the background medium with bulk modulus $K_b$. The Gauss-Newton Hessian times vector can then be seen as $$\int \frac{\partial^2 E}{\partial K_b(r) \partial K_b(r')} \tilde{K}(r') dV' = -\int \int \int \tilde{p}_d \frac{\partial p_d}{\partial K_b(r)} dt \, dS_s \, dS_g \quad (8)$$

$$= \int \int \int \tilde{p}_d \frac{\partial p_b}{\partial K_b(r)} dt \, dS_s \, dS_g.$$

Therefore, computation of the Gauss-Newton Hessian times vector is equivalent to gradient computation using artificial residual $\tilde{p}_d$. As mentioned above, the artificial residual $\tilde{p}_d$ is computed using the Born approximation in the background model with scatterers $\tilde{K}$. If the wave equation is linear so that the Born approximation is exact, and if $\tilde{K} = K - K_b = K_d$, then the artificial residual $\tilde{p}_d = p_d$. Therefore, the negative of Hessian times vector above should be equal to the gradient in this case.

It may be noted that the Born scattered field $\tilde{p}_d$ in Eq. 7 can be approximated as $$\tilde{p}_{d,F} = \frac{1}{\epsilon}(\tilde{p}_F - p_b), \quad (9)$$

where $\tilde{p}_F$ is the solution to the wave equation $$\nabla^2 \tilde{p}_F(r) - \frac{\rho}{K_b(r) + \epsilon \tilde{K}(r)} \ddot{\tilde{p}}_F(r) = -q(t)\delta(r - r_s). \quad (10)$$

If $\epsilon$ in Eq. 10 is sufficiently small, $\tilde{p}_F$ should be approximately equal to the summation of $p_b$ and the Born scattered field due to $\delta\tilde{K}$. Since the amplitude of Born scattering is linear with respect to the medium property perturbation of the scatterers, $\tilde{p}_{d,F}$ in Eq. 9 should be approximate equal to $\tilde{p}_d$ in Eq. 7.

The Hessian times vector operation can be approximated as $$\int \frac{\partial^2 E}{\partial K_b(r) \partial K_b(r')} \tilde{K}(r') dV' = \iiint \tilde{p}_d \frac{\partial p_b}{\partial K_b(r)} dt dS_s dS_g \quad (11)$$

$$\approx \iiint \tilde{p}_{d,F} \frac{\partial p_b}{\partial K_b(r)} dt dS_s dS_g.$$

The equation above shows that one can compute the Hessian times vector by (1) creating a new subsurface model $K_b + \epsilon\tilde{K}$, (2) computing the received field $\tilde{p}_F$ in the new subsurface model, (3) computing the gradient in the background model $K_b$ by treating $\tilde{p}_F$ to be a field measurement, and (4) scaling the gradient by $1/\epsilon$. Since these operations uses only forward wave propagation and gradient computation, this method eliminates the need to implement the Hessian times vector operators, i.e. eliminates the need to implement a computer program that computes the Hessian times vector. Instead, one can reuse already existing forward propagation and gradient computation routines to obtain the Hessian times vector. Of course, this advantage disappears if one has already implemented the Hessian times vector operation. Furthermore, the operation disclosed herein requires roughly 3.5 wave propagations compared to 4 wave propagations in Eq. 6, and so is computationally more efficient.

One can further improve the convergence to minima by increasing the value of $\epsilon$ in Eq. 10. When the value of $\epsilon$ is increased, the scattered field $\tilde{p}_{d,F}$ in Eq. 9 departs from the Born scattered field, and it includes nonlinear effects such as multiple scattering, travel time change, and nonlinear amplitude scaling with respect to $\tilde{K}$. One special case of a large $\epsilon$ value is when $\epsilon=1$, and $\tilde{K}=K_d$. In this case, the wave equation 10 is the wave equation for the true subsurface medium, and so $\tilde{p}_F=p$. The Hessian times vector in Eq. 11 is then exactly equal to the gradient, which is never achieved in Eq. 6 even when $\tilde{K}=K_d$ due to the neglected higher order terms in Eq. 6.

For practical purposes, we may define $\epsilon$ to be $$\epsilon = \alpha \frac{\|K_b(r)\|_{max}}{\|\tilde{K}(r)\|_{max}}, \quad (12)$$

where $\|K_b(r)\|_{max}$ and $\|\tilde{K}(r)\|_{max}$ are the maximum absolute values of $K_b$ and $\tilde{K}$ in space, respectively. The parameter $\alpha$ then represents approximate fractional change of $\delta\tilde{K}(r)$ in Eq. 10 with respect to $K_b(r)$. Thus, $\alpha$ represents the ratio of the magnitude of the vector to be added to the model to the magnitude of the model vector, where the model's medium parameters are the components of the model vector in model space. One can then choose the value of $\alpha$ to control the behavior of the Hessian times vector in Eq. 11. When the value of $\alpha$ is fairly small, on the order of 0.01, the Hessian operator in Eq. 11 mimics the behavior of Gauss-Newton Hessian in Eq. 5. When the value of $\alpha$ is relatively large and reaches on the order of 0.1, on the other hand, the Hessain operator in Eq. 11 starts to include the effect of nonlinearity and multiple scattering, and so behaves similar to that in Eq. 4.

While the equation above was derived specifically for the bulk modulus K, this method can be applied for the computation of the Hessian times vector of any general elastic parameters such as density $\rho$ or any of the 21 elastic stiffness constants $C_{ij}$. Let $m_b(r)$ and $\tilde{m}(r)$ be the background medium properties and the multiplication vector of any of these elastic parameters. Then the Hessian times vector of any of these properties can be computed as $$\int \frac{\partial^2 E}{\partial m_b(r) \partial m_b(r')} \tilde{m}(r') dV' = \int \left[ \iiint \frac{\partial p_d}{\partial m_b(r)} \frac{\partial p_d}{\partial m_b(r)} dt dS_s dS_g \right] \tilde{m}(r') dV' \quad (13)$$

$$= \iiint \frac{\partial p_d}{\partial m_b(r)} \left[ \int \frac{\partial p_d}{\partial m_b(r)} \tilde{m}(r') dV' \right] dt dS_s dS_g$$

$$= -\iiint \tilde{p}_d \frac{\partial p_d}{\partial m_b(r)} dt dS_s dS_g$$

$$= \iiint \tilde{p}_d \frac{\partial p_b}{\partial m_b(r)} dt dS_s dS_g,$$

where $\tilde{p}_d$ now can be computed using the same method as that in Eqs. 9 and 10. Note this derivation is generally applicable to any type of objective functions such as $L_2$ objective function given in Eq. 1 or cross-correlation objective function in Ref 8. Note also that the method presented here is a special case of PDE (Partial Differential Equation) constrained optimization problems, and so the method is in general applicable to any PDE constrained optimization problems where Hessian times vector needs to be computed. For example, this method can also be applied to problems relating to electromagnetic wave propagation.

Figure 2:
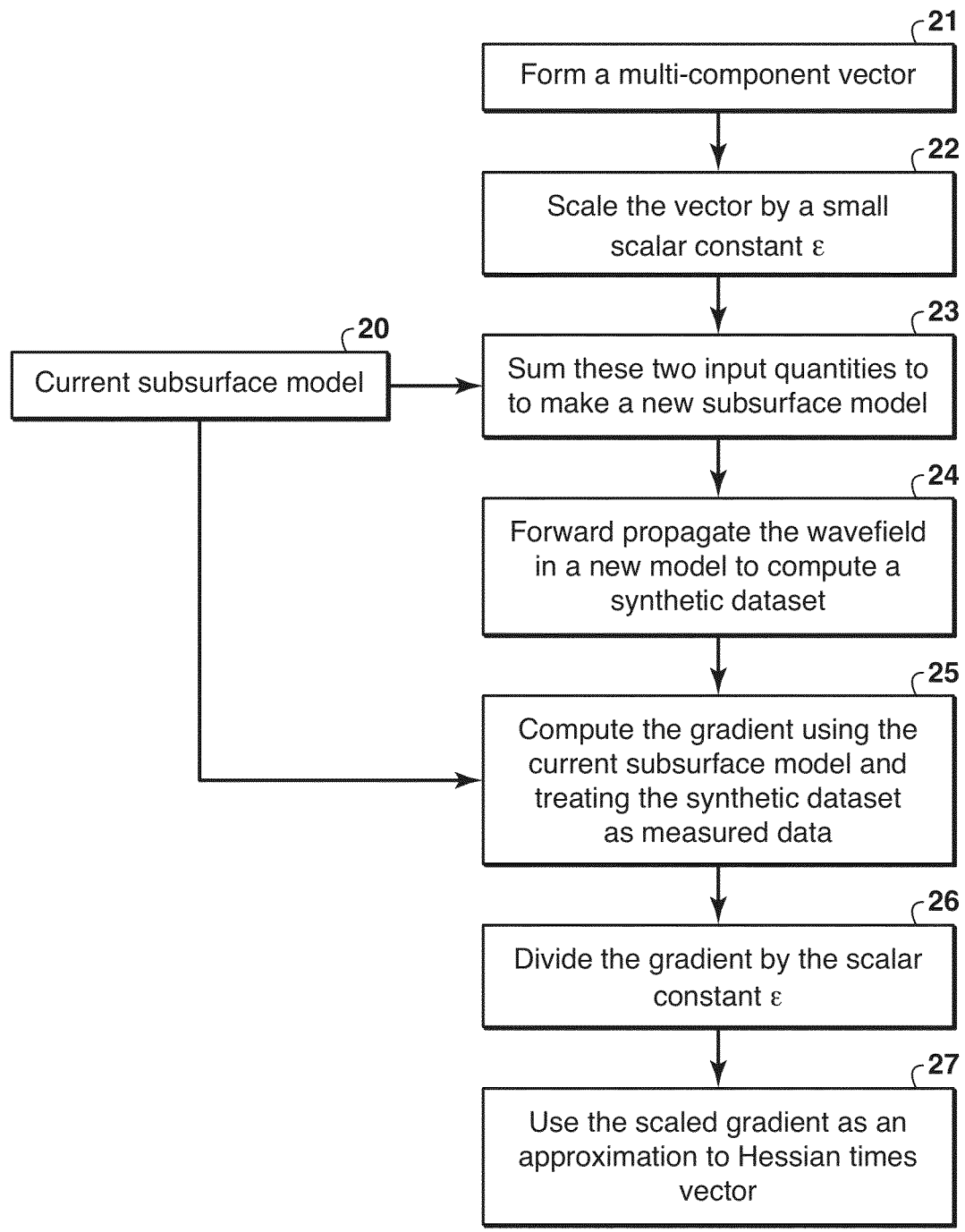
FIG. 2 is a flowchart showing basic steps in one embodiment of the present inventive method.

Below is the procedure of the present invention as applied to, for example, determining the model update in a method for physical property parameter estimation by data inversion using the gradient of an objective function, with the steps as shown in the flowchart of FIG. 2:

Step 21 Form a multi-component vector whose components are related to the values of a selected physical property at discrete cells in a model of the subsurface according to a current subsurface model 20 of that property (for the present example, the vector would typically be the gradient of the objective function, but in a general application of the inventive method, this would be whatever vector is later to be multiplied by the Hessian);

Step 22 Scale the vector by a small scalar constant ($\epsilon$), i.e. by multiplying by $\epsilon$;

Step 23 Add the scaled vector to the current subsurface model;

Step 24 Forward propagate the wavefields in the new model to compute a synthetic seismic dataset;

Step 25 Compute the gradient of the objective function measuring misfit (typically a selected norm of the data residual) between forward modeled data using the current subsurface model and "measured" data, where the synthetic seismic dataset from step 24 is treated as the measured data for purposes of this step;

Step 26 Divide the gradient from step 25 by the scalar constant ϵ from step 22,

Step 27 Use this scaled gradient as an estimate of the Hessian times vector in optimization routines that require evaluation of that Hessian times vector.

Then, steps 21 to 27 may be repeated iteratively, using a Newton-CG algorithm for example, to obtain the inverse of the Hessian times the gradient of the objective function, which gives the model (medium parameter) update. Here, the objective function measures misfit between the actual measured field data and the data modeled from the current model.

The sum in step 23 is performed, cell-by-cell, in the discrete subsurface property model. For example, for application to model parameter estimation by geophysical data inversion, the "vector" will typically start out being the multi-dimensional gradient of the objective function with respect to each model parameter. Thus, the gradient of the objective function is a vector with as many components as there are cells in the model, times the number of subsurface parameters, such as bulk modulus or density. For each cell, the corresponding component of the vector, after being scaled, is added to the model value, sometimes called parameter, for that cell.

The method of steps 21-27 may be used in the iterative solving of any partial differential equation involving the Hessian times vector operation.

EXAMPLE

Figure 3A:
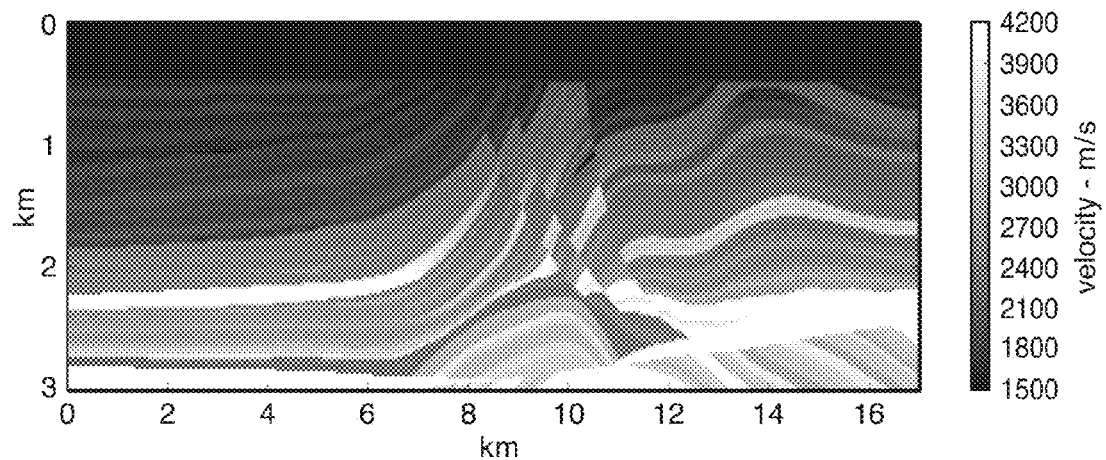
FIG. 3A shows a "true" subsurface velocity model for generating seismic data in a synthetic test example of the present inventive method.
Figure 3B:
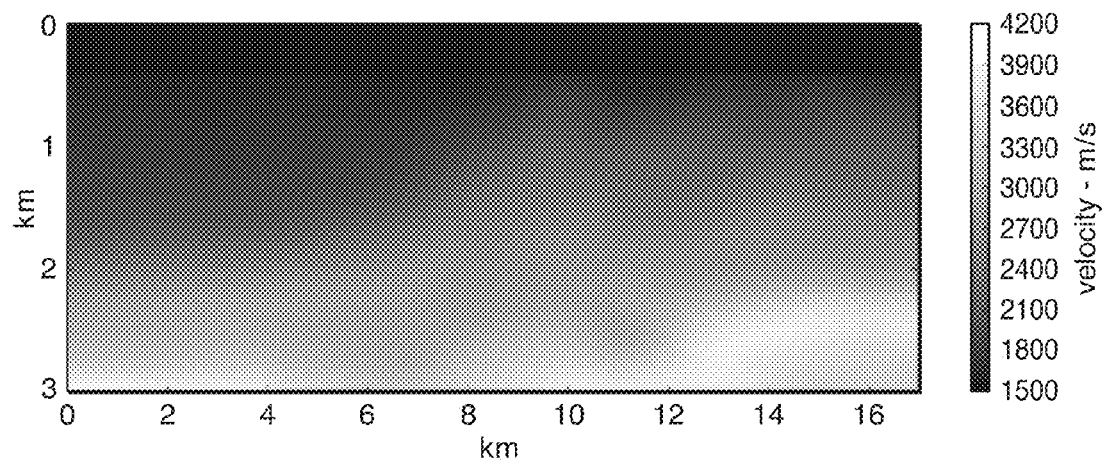
FIG. 3B shows the initial velocity model used in iterative full wavefield inversion employing the method of the present invention.

For an illustrative example, we use the Marmousi II model [4] shown in FIG. 3A. This is the "true" model that was used to generate the synthetic data that was assumed to be the measured data for purposes of this example. The initial model for the full wavefield inversion is given in FIG. 3B. The inversion was performed by the encoded-simultaneous-source method described in Ref [2], which discusses the Marmousi II model and includes the two drawings reproduced here. The inversion result using the Newton's method as a function of computation time is shown in FIG. 1. The solid line is the result using Gauss-Newton Hessian, the dashed line is the result using the present invention where α=0.01 in equation (12), and the dotted line is the result using the present invention where α=0.1. In other words, the solid line uses the Gauss-Newton Hessian times vector in equation (8), with the inverse evaluated by the C-G method without benefit of the present invention, whereas the two broken lines use the Hessian times vector in equation (11) with the inverse evaluated by the C-G method with benefit of the present invention Convergence of full waveform inversion is shown as a function of computation time. Both computation time and the model fit are normalized to 1. Model fit is defined to be an RMS velocity error between the inverted and the true model, as defined in Ref [2]. The dots in the lines mark the time for 1 iteration of the Newton method.

One can see from FIG. 1 that the present invention yields roughly 40% speed up in the convergence compared to the result using the Gauss-Newton Hessian when α=0.01. One can further improve the convergence by increasing the value of α to 0.1 so that more nonlinear effects are included in the Hessian times vector approximation. However, if the value of alpha were to be further increased, the new model in Step 23 above might be non-physical, with the result that one may not even be able compute the forward wavefield in Step 24. For example, the velocity of the new summation model might become negative.

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

REFERENCES

[1] A. Baumstein, J. E. Anderson, D. Hinkley, and J. R. Krebs, "Scaling of the objective function gradient for full wavefield inversion," 79th SEG Annual International Meeting, Expanded Abstract, (2009).

[2] J. R. Krebs, J. E. Anderson, D. Hinkley, R. Neelamani, S. Lee, A. Baumstein, and M.-D. Lacasse, "Fast full-wavefield seismic inversion using encoded sources," Geophysics, 74:WCC177-188, (2009).

[3] S. Lee, J. R. Krebs, J. E. Anderson, A. Baumstein, and D. Hinkley, "Methods for subsurface parameter estimation in full wavefield inversion and reverse-time migration," 80th SEG Annual International Meeting, Expanded Abstract, (2010).

[4] G. S. Martin, R. Wiley, K. J. Marfurt, "Marmousi2: An elastic upgrade for Marmousi," The Leading Edge 25, 156-166 (2006).

[5] J. Nocedal and S. J. Wright, Numerical Optimization, Springer, Chap. 7.1, New York, 2nd edition (2006).

[6] R. E. Plessix, "A review of the adjoin-state method for computing the gradient of a functional with geophysical applications," Geophys. J. Int., 167:495-503, (2006).

[7] R. G. Pratt, C. Shin, and G. J. Hicks, "Gauss-Newton and full Newton methods in frequency-space seismic waveform inversion," Geophys. J. Int., 133:341-362, (1998).

[8] P. Routh, J. Krebs, S. Lazaratos, A. Baumstein, S. Lee, Y. H. Cha, I. Chikichev, N. Downey, D. Hinkley, and J. Anderson, "Encoded simultaneous source full-wavefield inversion for spectrally shaped marine streamer data," 81st SEG Annual International Meeting, Expanded Abstract, (2011).

[9] A. Tarantola, "Inversion of seismic reflection data in the acoustic approximation," Geophysics, 49:1259-1266, (1984).

[10] A. Tarantola, "A strategy for nonlinear elastic inversion of seismic reflection data," Geophysics, 51:1893-1903, (1986).

[11] A. Tarantola, "Inverse Problem Theory and Methods for Model Parameter Estimation," SIAM, (2005).

The invention claimed is:

1. A method for determining a discrete physical properties model of a subsurface region, referred to herein as the model or the subsurface model, by iteratively inverting measured geophysical data acquired from the subsurface region, comprising:

approximating a Hessian matrix of an objective function, then times a vector, called Hessian times vector, using a computer, with a single forward-wave simulated propagation and a single computation of gradient of the objective function, in a modified subsurface model, thereby requiring only three forward-wave or reverse-wave propagations;

wherein said approximation is based on an approximate equation for a Born scattered pressure field, $\tilde{p}_{d,F}$, where the Hessian times vector is approximated by a gradient computation using $\tilde{p}_{d,F}$ as an artificial residual;

then computing a direction in model parameter space for an update to a current model by multiplying inverse of the Hessian matrix times a gradient of the objective function, wherein the inverse of the Hessian matrix is computed iteratively using a conjugate gradient method in which said approximate Hessian times vector is used to evaluate the Hessian matrix times a model perturbation vector;

performing a line search to determine magnitude of the model update using said computed direction; and adding the model update to the current model to form an updated model, and using the updated model for geophysical prospecting.

2. The method of claim 1, wherein the modified subsurface model is a linear combination of a current subsurface model and the vector.

3. The method of claim 2, wherein the linear combination= the current subsurface model +{(a scalar constant)×(the vector)}, wherein 0<the scalar constant≤1.

4. The method of claim 3, wherein the scalar constant is chosen according to whether the Hessian matrix will be computed exactly, which means taking multiple scattering into account, or will be approximated by the Gauss-Newton Hessian matrix.

5. The method of claim 4, wherein if the Gauss-Newton approximation is to be used, the scalar constant is chosen such that {(a scalar constant)×(the vector)} is approximately 1% in magnitude of the current subsurface model; but if the Hessian matrix is to be computed exactly, then the scalar constant is chosen so that the {(a scalar constant)×(the vector)} is approximately 10% in magnitude of the current subsurface model.

6. The method of claim 3, wherein the vector in a first iteration of the method is gradient of the objective function with respect to parameters of the model, wherein the objective function measures misfit between the measured geophysical data and corresponding synthetic geophysical data simulated using the model, said misfit being a selected norm of a data residual, wherein the data residual is the difference between the measured geophysical data and corresponding synthetic geophysical data simulated using the model; provided that for said single computation of gradient of the objective function, the measured geophysical data in the data residual is replaced by synthetic data simulated using the modified subsurface model, and the data residual is divided by the scalar constant.

7. The method of claim 1, where the measured geophysical data being inverted is a full wavefield of seismic data.

8. The method of claim 7, where the physical properties model is a model of at least one of a group consisting of 21 elastic constants including bulk modulus; density; or any combination of two or more of them.

9. The method of claim 1, wherein $\tilde{p}_{d,F}$ is approximated as $$\tilde{p}_{d,F} = \frac{1}{\varepsilon}(\tilde{p}_F - p_b),$$

where $\varepsilon$ is a number smaller than a pre-determined value, $p_b$ is a pressure modeled using a current subsurface model, and $\tilde{p}_F$ is the solution to a wave equation $$\nabla^2 \tilde{p}_F(r) - \frac{\rho}{K_b(r) + \varepsilon \tilde{K}(r)} \ddot{\tilde{p}}_F(r) = -q(t)\delta(r - r_s).$$

10. The method of claim 9, wherein said approximation further includes taking $\tilde{p}_{d,F}$ to be equal to $\tilde{p}_d$, where $\tilde{p}_d$ is difference between measured pressure and the modeled pressure $p_b$.

11. A method for determining a discrete physical properties model of a subsurface region by iteratively inverting measured geophysical data acquired from the subsurface region, comprising using a Hessian matrix operating on an objective function, then times a vector, called Hessian times vector, to determine an update for an initial model, wherein the Hessian times vector is approximated, using a computer, with a single forward wave simulated propagation and a single gradient of the objective function computation in a modified subsurface model thereby requiring only three forward-wave or reverse-wave propagations, comprising:

forming a scaled vector by multiplying the vector by a number $\varepsilon$, where $0<\varepsilon \leq 1$, and adding the scaled vector to the initial model;

simulating a first synthetic data set using the model with the scaled vector added to it;

forming the objective function to measure misfit between a second synthetic data set, simulated using the initial model, and said first synthetic data set;

computing a gradient of the formed objective function with respect to the physical property parameters, dividing the gradient by $\varepsilon$, and using that as an estimate of the Hessian times vector;

computing a direction in model parameter space for an update to the initial model by multiplying inverse of the Hessian matrix times a gradient of the objective function, wherein the inverse of the Hessian matrix is computed iteratively using a conjugate gradient method in which said estimate of the Hessian times vector is used to evaluate the Hessian matrix times a model perturbation vector;

performing a line search to determine magnitude of the model update using said computed direction; and adding the model update to the initial model to form an updated model, and using the updated model for geophysical prospecting.

12. The method of claim 11, wherein the vector in a first iteration of the iterative inversion is gradient in model space of the objective function, wherein the objective function measures misfit between the measured geophysical data and corresponding model-simulated geophysical data.

13. A computer program product, comprising a non-transitory computer usable medium having a computer readable program code embodied therein, said computer readable program code adapted to be executed to implement a method for determining a discrete physical properties model of a subsurface region, referred to herein as the model or the subsurface model, by iteratively inverting measured geophysical data acquired from the subsurface region, said method comprising:

using a Hessian matrix of an objective function, then times a vector, called Hessian times vector, to determine an update for the model, wherein the Hessian times vector is approximated with a single forward-wave simulated propagation and a single computation of gradient of the objective function in a modified subsurface model, thereby requiring only three forward-wave or reverse-wave propagations;

wherein said approximation is based on an approximate equation for a Born scattered pressure field $\tilde{p}_{d,F}$, where the Hessian times vector is approximated by a gradient computation using $\tilde{p}_{d,F}$ as an artificial residual;

then computing a direction in model parameter space for an update to a current model by multiplying inverse of the Hessian matrix times a gradient of the objective function, wherein the inverse of the Hessian matrix is computed iteratively using a conjugate gradient method in which said approximate Hessian times vector is used to evaluate the Hessian matrix times a model perturbation vector;

performing a line search to determine magnitude of the model update using said computed direction; and adding the model update to the current model to form an updated model.

14. The method of claim 13, wherein the vector in a first iteration of the iterative inversion is gradient in model space of the objective function, wherein the objective function measures misfit between the measured geophysical data and corresponding model-simulated geophysical data.

* * * * *